Figure 14:
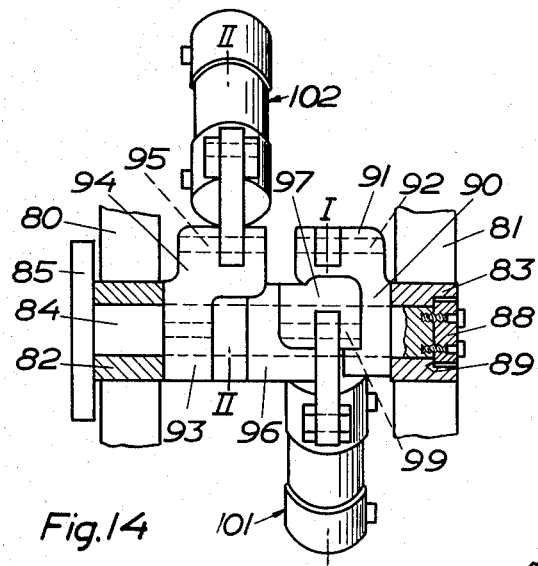

Oct. 5, 1965            W. MEYER            3,209,842
APPARATUS FOR ROTATING A SHAFT WITH FLUID PRESSURE CYLINDERS
Filed Feb. 14, 1961            5 Sheets-Sheet 1
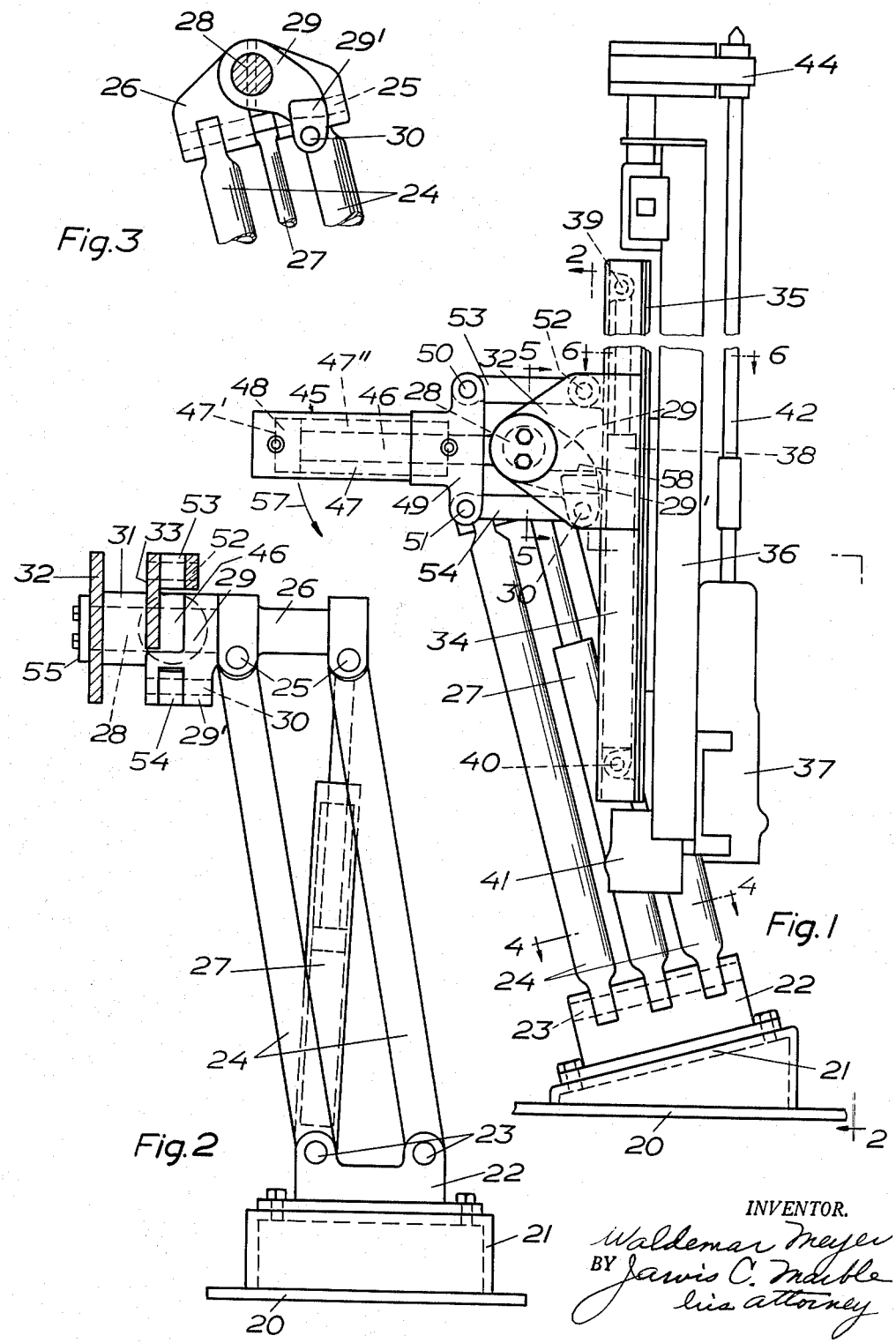
INVENTOR.
Waldemar Meyer
BY Jarvis C. Marble
his attorney Oct. 5, 1965 W. MEYER 3,209,842
APPARATUS FOR ROTATING A SHAFT WITH FLUID PRESSURE CYLINDERS
Filed Feb. 14, 1961 5 Sheets-Sheet 2
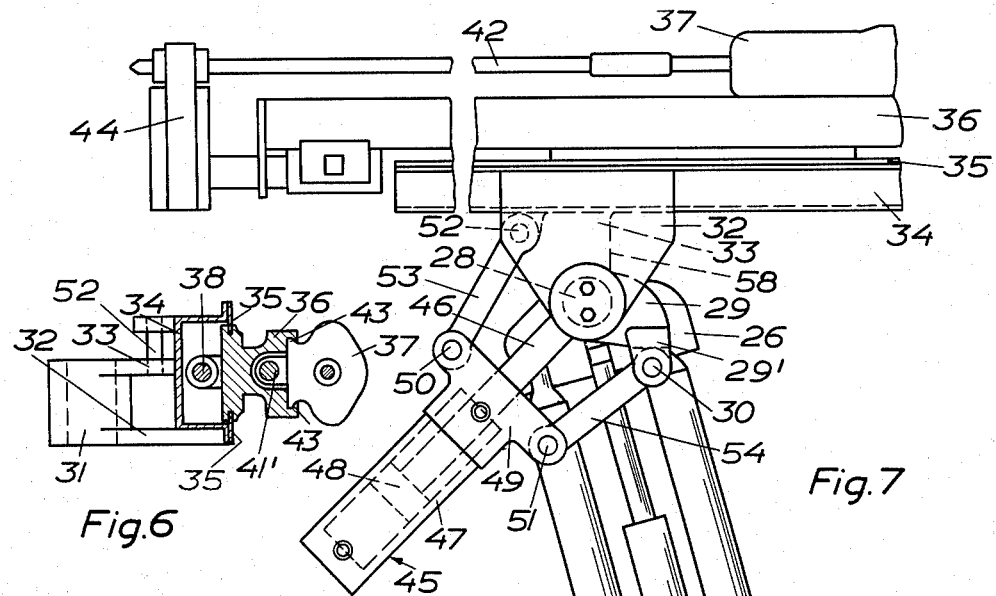
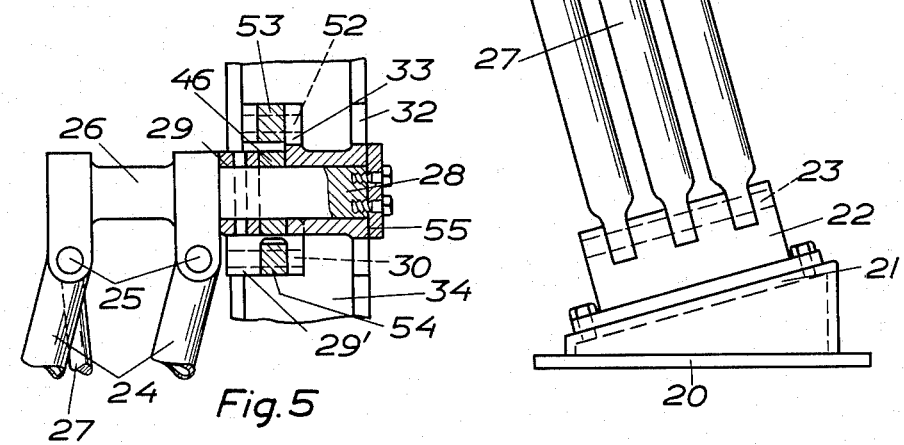
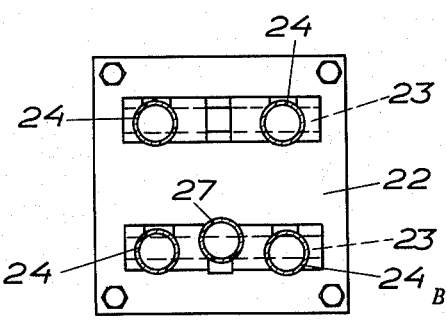
INVENTOR.
Waldemar Meyer
BY Jarvis C. Marble
his attorney

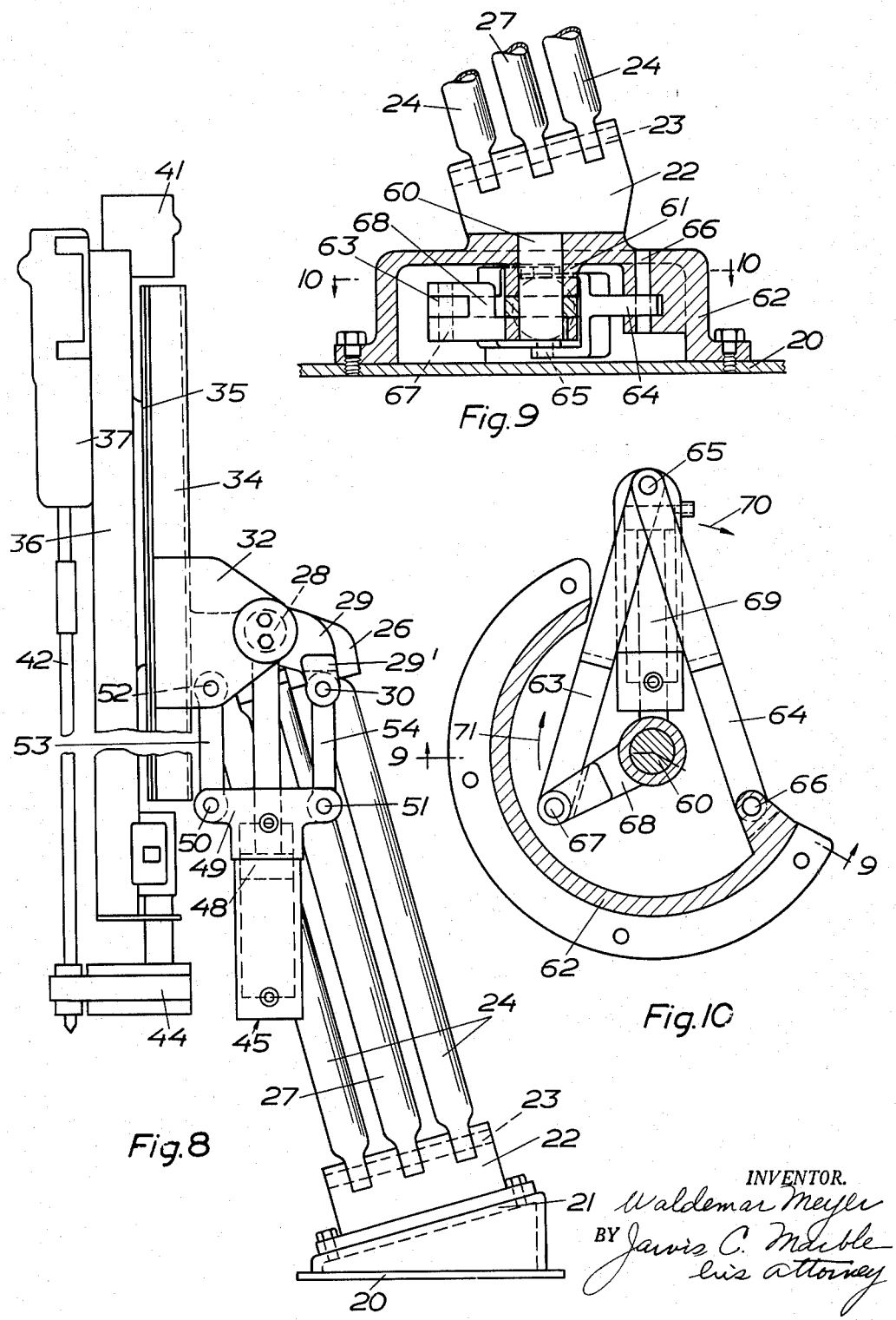

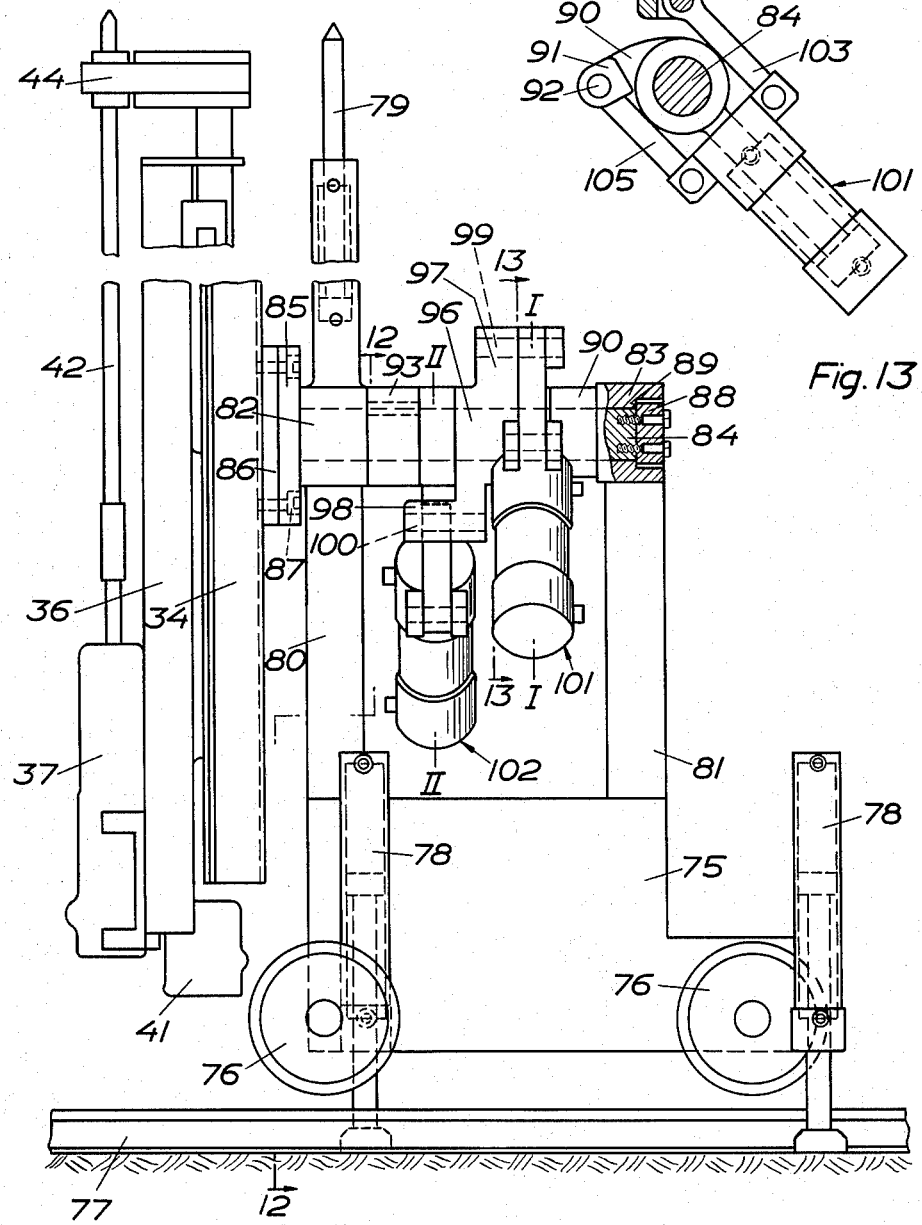

Oct. 5, 1965 W. MEYER 3,209,842
APPARATUS FOR ROTATING A SHAFT WITH FLUID PRESSURE CYLINDERS
Filed Feb. 14, 1961 5 Sheets-Sheet 5

INVENTOR.

United States Patent Office 3,209,842
Patented Oct. 5, 1965

3,209,842
APPARATUS FOR ROTATING A SHAFT WITH FLUID PRESSURE CYLINDERS
Waldemar Meyer, Stockholm, Sweden, assignor to Atlas Copco Aktiebolag, Nacka, Sweden, a corporation of Sweden
Filed Feb. 14, 1961, Ser. No. 89,234
15 Claims. (Cl. 173—43)

This invention relates in its broader aspects generally to turning means for providing angular adjustability for pieces of machinery or equipment turnably arranged on an axis. More particularly the invention may advantageously be applied to supporting structures for rock drills in which the drilling apparatus is supported on an adjustable drill rig, such specific use, however, not limiting the scope of the invention.

In rock drilling rigs it is conventional to provide adjustability between the different drill rig members by arranging one drill rig member swivelly about an axis with respect to the other and by providing power jack means, for example a fluid actuated power jack, between the members for swivelling one member one way or the other about said axis with respect to the other member. The constructions hitherto used to attain said purpose incorporate in their simplest embodiment a direct connection between the power jack means and the rig members and have normally to be used with an angle of operation well under 180° owing to the great variations in the torque transmitted. In some cases the swing has been increased by an arrangement in which the movement of the power jack means is transmitted from one member to the other through gears. Apart from such arrangement being expensive, there will normally also be a considerable play between the intermeshing gears such play affecting objectionally the rigidity of the drill rig and giving rise to considerable constructional complication if it is to be eliminated.

The invention contemplates a material improvement over known types of adjustable supporting structures or adjustable drill rigs in that a more efficient swingability and constructional simplicity and full rigidity of support are attained.

A primary object of the invention is to provide an adjustable supporting structure having novel means for obtaining an extended swingability between members of said structure which are swivelly arranged with respect to one another.

Another object of the invention is to provide an adjustable supporting structure having two swivelly arranged members and a single power jack means for turning one member through an angle of at least 180° with respect to the other.

Another object of the invention is to provide an adjustable supporting structure having two swivelly arranged members and a pair of power jacks for turning one member through an angle of at least 360° with respect to the other member.

Another object of the invention is to provide a drill rig incorporating a drilling apparatus swivelly arranged about a horizontal axis and a single power jack for effectively swivelling the drilling apparatus from a vertically upward position to a vertically downward position and vice versa, with drilling being performable in any intermediate or end position of the drilling apparatus.

Another object of the invention is to provide a drill rig incorporating a drilling apparatus swivelly arranged about a horizontal axis, an elongated parallelogram type of boom frame carrying said axis and enabling the drilling apparatus to be moved sideways through a wide range of drilling positions while remaining in vertical planes, and a single power jack for effectively swivelling the drilling apparatus form a vertically upward position to a vertically downward position and vice versa, with drilling being performable in any intermediate or end position of the drilling apparatus.

Another object of the invention is to provide a drill rig incorporating a drilling apparatus swivelly arranged about a horizontal axis and a pair of power jacks for effectively swivelling the drilling apparatus from for example a vertically upward position through a full revolution in one direction, again into upward position, and back again through a full revolution in the opposite direction, with drilling being performable in any intermediate or end position of the drilling apparatus.

The above and other objects of the invention will become obvious from the following description and from the accompanying drawings in which three embodiments of the invention are illustrated by way of example. It should be understood that these embodiments are only illustrative of the invention and that various modifications may be made within the scope of the claims without departing from the scope of the invention.

Figure 15:
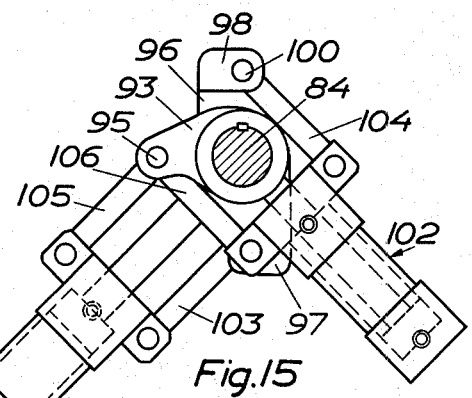
Figure 12:
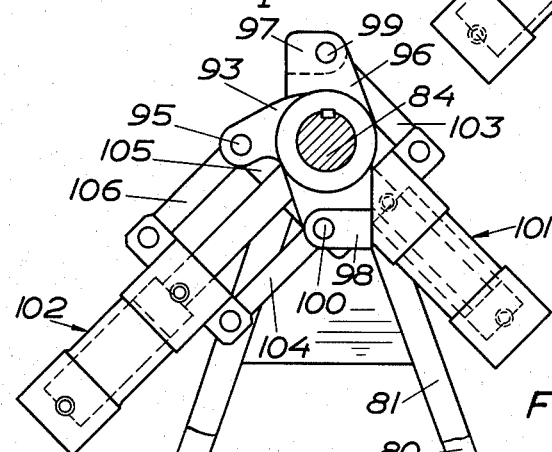
Figure 16:
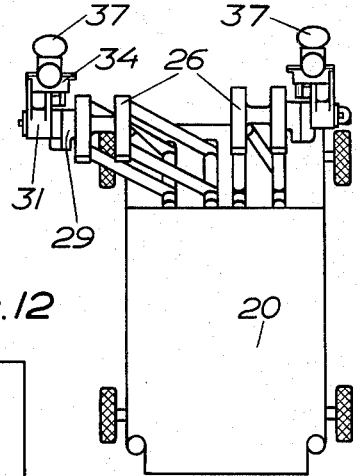

In the drawings, wherein like parts are designated by like reference characters throughout the several views, FIG. 1 shows a side view of a drill rig according to the invention with the drill in vertically upward position, FIG. 2 shows a view partly in section on line 2—2 in FIG. 1, FIG. 3 shows the head member of the boom frame in FIG. 1 with the drilling apparatus removed, FIG. 4 shows a sectional view on line 4—4 in FIG. 1, FIG. 5 shows a fragmentary view partly in section on line 5—5 in FIG. 1, FIG. 6 shows a sectional view on line 6—6 in FIG. 1, FIG. 7 shows a side view corresponding to FIG. 1 but with the drill in horizontal position, FIG. 8 shows a side view corresponding to FIG. 1 but with the drill in vertically downward position, FIG. 9 shows a vertical section and fragmentary side view on line 9—9 in FIG. 10 of a modified mounting of the drill rig in FIG. 1, FIG. 10 shows a section on line 10—10 in FIG. 9, FIG. 11 shows a side view of a modified drill rig according to the invention, FIG. 12 shows partly in section a front view of the drill rig in FIG. 11 with the drilling apparatus removed, FIG. 13 shows a view on line 13—13 in FIG. 11, FIG. 14 shows partly in sestion a fragmentary top view of the drill rig in FIG. 11, FIG. 15 shows a fragmentary view corresponding to FIG. 12 but showing the power jacks after a full revolution through 360° of the shaft shown in section, and FIG. 16 shows a top view of a drill carriage incorporating a paired arrangement of the drill rig according to FIGS. 1–8.

The adjustable supporting structure or drill rig illustrated in FIGS. 1–8 consists of a fragmentarily indicated frame 20, which in a conventional manner may be mounted for example on wheels or track frames not shown, or may be mounted in other ways. A pedestal 22 is bolted to an inclined platform 21 on the frame 20 and carries in vertical planes two spaced apart parallel pivots 23. Four elongated struts 24 of equal length are pivotally arranged to swing on the ends of the pivots 23 in parallel planes transverse to the pivots and are at their remote ends pivotally connected to spaced apart parallel pivots 25 which also are parellel to the pivots 23 and fixed to a head member 26. Diagonally between one of the pivots 23 and one of the pivots 25 is arranged a fluid operated double acting power jack 27 for swinging the struts together with the head member one way or the other in an inclined central plane transverse to the pivots 23, 25. The head member 26, the struts 24 and the inclined pedestal form a boom frame of parallelogram type.

Formed integrally with the head member 26 and protruding sideways therefrom is a shaft 28. Fixedly connected to the shaft 28 is a radially extending lever 29 forming an end portion of the head member 26 and having a widened forked end 29¹ forming a support for the ends of a pivot 30 extending in offset and parallel relation with respect to the axis of the shaft 28. Pivotally arranged on the shaft 28 is a collar 31, which by means of spaced apart outer and inner end portions of bracket plates 32, 33 is connected to an elongated guide frame member 34. Reciprocally arranged on guides 35 along said guide frame member 34 is a feed bar 36 for a drill 37. A power cylinder 38 is connected at one end 39 to the guide frame member 34 and at the other end 40 to the feed bar 36 and serves to move the feed bar 36 longitudinally of itself relatively to the guide frame member 34. 41 indicates diagrammatically a drill feed motor which for example over a feed screw 41¹, FIG. 6, or in other ways serves to feed the drill 37 together with a drill steel 42 towards a rock face. The drill 37 is guided for reciprocation on the drill feed bar 36 along suitable guideways 43, FIG. 6, and the feed bar may also carry a drill steel guide 44. The details of the drill, the feed bar, the feed motor and the drill steel guide are not illustrated in detail since they may be carried out in any conventional manner well known to those familiar with the art.

Between the inner end portion of bracket plate 33 and the end portion of lever 29 there is pivotally arranged on the shaft 28 one end of a power jack, for example the stem end 46 of a fluid actuated, preferably hydraulically actuated double acting telescoping power jack 45, having a cylinder 47 and a piston 48 which latter is connected to the stem 46. The cylinder 47 of the power jack 45 is tightly closed by a yoke member 49 through which the stem 46 protrudes. On opposite sides of the yoke member 49 are arranged two pivots 50, 51 extending in parallel relation with respect to the shaft 28. Fixedly connected to the inner bracket plate 33 is a pivot 52 extending in offset and parallel relation with respect to the shaft 28. The pivots 50, 52 and 51, 30, respectively, are interconnected by links 53, 54 extending on opposite sides of the stem 46 and forming a toggle connection between the fixed end portion of lever 29 and the guide frame member 34, in which connection the yoke member 49 forms the knee joint. The stem 46 and the collar 31 are kept in place on the shaft 28 by means of a circular end plate 55, fixedly connected to the free end of the shaft 28 as by bolts.

The pressure fluid for operation of the different power cylinders and the drill of the illustrated drill rig is supplied from suitable sources not illustrated and the various hoses for conveying pressure fluid have been omitted since they would make the drawing rather congested and since the provision of such hoses or conduits is obvious to those skilled in the art.

In FIG. 1 the drill rig according to the invention is illustrated in position for drilling holes vertically upward. It is obvious that swinging of the struts 24 of the boom frame to the left or to the right in FIG. 2 by means of the power jack 27 transversely of the frame 20 moves the drill steel 42 sideways parallel to itself. This enables the operator to drill a number of vertical parallel holes along a line transversely of the frame structure in which the fragmentarily indicated frame 20 is incorporated. The right and the left hand swing of the boom frame in FIG. 2 may be limited for example by the full expansion and contraction of the power jack 27.

When it is desired to drill groups of holes in a fan shaped arrangement, the operator by manipulating the power jack 45 may swing the guide frame member 34 on the shaft 28 from the position of FIG. 1 to any intermediate position between the positions of FIGS. 1 and 8. By supplying in the FIG. 1 position of the drill rig parts pressure fluid such as oil to the chamber 47¹ in the cylinder 47 of the power jack 45, said cylinder is urged to the left in FIG. 1 but is prevented from moving straightly by the link 54, which connects the pivot 51 of the yoke 49 to the pivot 30 of the fixed end portion of lever 29. Instead the link 54 forces the pivot 51 to rotate around the pivot 30, which means that the power jack 45, while expanding, is forced to rotate around the shaft 28 in the direction of the arrow 57. The rotation and simultaneous expansion of the power jack 45 displaces the pivots 50, 51 of the yoke 49 along a path extending from a position adjacent to the shaft 28, FIG. 1, to an angularly offset position remote from said shaft 28, FIG. 8. The movement of the pivot 50 is transmitted by means of the link 53 to the guide frame member 34, which consequently has to swing on the shaft 28 through an angle defined by the extension and shape of the path of the pivot 50. With the arrangement illustrated, in which the links 53, 54 are of equal length and the distances between the shaft 28 and the pivots 52 and 30 are equal, the pivot 50 describes a path which corresponds to a doubling of the angular throw of the guide frame member 34 on the shaft 28 with respect to the angular throw of the power jack 45. As shown in FIGS. 7 and 8 a power jack throw of 45° and 90° results in a throw of 90° and 180°, respectively, of the guide frame member 34. It is obvious that by supplying pressure fluid to the chamber 47¹¹ and venting the chamber 47¹¹, FIG. 1, the guide frame member 34 may be swung back from the position with the drill steel vertically downward, FIG. 8, to the vertically upward position of FIG. 1. The power jack 45 may be locked hydraulically to keep the drill steel in such or in any intermediate angular position by means of suitable valve means, per se well known in the art and therefore not shown. Thus it is seen that in the illustrated arrangement by the use of a single power jack and the toggle means represented by the links 53, 54 and the yoke 49 is attained an angular throw of 180°, which in practice preferably should be extended to some 200°. This, however, is not the maximum throw value attainable, it being possible to extend the resultant throw, if necessary, up to 240° by increasing the stroke of the power jack 45, giving the guide frame member more freedom of movement with respect to the power jack and the fixed lever and modifying the dimensions of the toggle arrangement. In order to provide for freedom of movement for the throw of the guide frame member 34 the end portion of bracket plate 33 is undercut at 58, leaving in the FIG. 1 position room for the forked end 29¹ of the end portion of lever 29, as indicated in dotted lines, while, as shown in the FIG. 8 position, the throw may be continued until the yoke 49 contacts the guide frame member 34.

The drill rig illustrated in FIGS. 1–8 may, as indicated in FIG. 16 in which two drills 37 are positioned for drilling vertically downward, be paired in an arrangement with two rigs mounted side by side on the forward end of a common wheeled frame 20. The collars 31 of the drilling apparatuses are directed outwardly and transversely of the frame in opposite directions. In this case the head member 26 of one of the rigs is arranged reciprocable from a vertical position to the right only transversely of the frame 20 while the head member 26 of the other rig is arranged reciprocable from the vertical position to the left only. The arrangement of the rigs is symmetrical with respect to a central vertical longitudinal plane through the frame 20.

By modifying the length of the toggle links 53, 54 and the distances between the pivots 30, 52 and the shaft 28, other relations than the illustrated between the angular throw of the guide frame member and the power jack may be attained.

Obviously the turning device of FIGS. 1–8 may be associated with any other suitable piece of machinery to be provided with an extended power swing with respect to a support carrying a shaft and a lever similar to the shaft 28 and lever 29.

In FIGS. 9 and 10 there is illustrated a mounting on a wheeled or other frame 20 which mounting may be arranged to swivelly support the boom frame struts 24 and the pedestal 22 of the embodiment of FIGS. 1–8 or may be arranged to support any suitable other piece of machinery. To the underside of the pedestal 22 there is affixed a vertical central pivot 60 journalled on a casing 62 in a bearing 61 by which the pedestal 22 is turnably supported. The casing 62 accommodates a mechanism for turning the pedestal 22 on the casing 62 by means of the central pivot 60, which mechanism is a modification of the turning mechanism incorporated in the embodiment of FIGS. 1–8. The casing 62 is fixedly mounted on the frame 20 as by bolts. The modified turning mechanism consists of a toggle of forked links 63, 64 pivoted with their forked ends on a pivot 65, which forms the knee of the toggle. The other end of the link 64 is connected by means of a pivot 66 to the end portion of inner wall of the casing 62, while the other end of the link 63 is connected by means of a pivot 67 to the forked free end of an end portion of lever 68, which is keyed to the central pivot 60. Between the pivot 65 and the central pivot 60 there is arranged pivotally on said pivots a fluid actuated double acting power jack 69.

The operation of the turning mechanism of FIGS. 9, 10 is identical with the operation of the turning mechanism of the embodiment of FIGS. 1–8 and will therefore not be repeated. It is readily seen that extension of the power jack 69 in FIG. 10 results in a turning motion of the power jack 69 in the direction of the arrow, 70, which angular motion is transmitted by the link 63 to the end portion of lever 68 resulting in a doubled angular motion in the direction of the arrow 71 transmitted to the pedestal 22.

By providing the drill rig of FIGS. 1–8 with a mounting according to the arrangement of FIGS. 9, 10, the operator may for example first drill groups of holes in a fan shaped arrangement from a vertically downward position of the drill steel 42 through an angle of 180° to a vertically upward position, whereupon he may turn the pedestal through 180° so that the fan arrangement of the bore holes may, after a correction of the lateral position of the drill steel by the boom frame, be completed through the remaining 180° of a full circle.

The forked links 63, 64 may be replaced by two pairs of parallel spaced apart linear links extending between spaced apart journals on the pins 66, 67 and the opposite ends of the pivot 65. Such double-pair toggle link arrangement or alternatively two forked links mounted similarly to the arrangement of the links 63, 64 may replace the links 53, 54 in FIGS. 1–8.

In the modified embodiment of FIGS. 11–15 there is shown a drill rig in which the rig member incorporating the drill 42 is turnable through an angle of 360° with respect to a supporting rig member. The drill is comprises a carriage frame 75 supported by four wheels 76 for movement on tracks 77. The carriage frame 75 is elevatable by means of four hydraulic jacks 78 arranged at the corners of the frame 75, whereby a pointer bar or jack 79 may, for steadying purposes, be brought into engagement with or operative vicinity of an extraneous abutment such as the roof of a tunnel. A pair of spaced apart transverse vertical frames 80, 81 are carried by the carriage frame 75, and the pointer jack 79 is mounted on top of the forward frame 80. The frames 80, 81 carry on their upper ends bearings 82, 83, in which is journalled a horizontal shaft 84 extending longitudinally of the carriage frame 75. The shaft 84 extends beyond the front bearing 82 and forms a vertical flange 85 adjacent thereto.

A drilling apparatus, which as shown may be identical with the drilling apparatus of FIGS. 1–8, has a bracket plate 86 connected to the bottom of its guide frame member 34. Said bracket plate 86 is connected to the flange 85 of the shaft 84 as by bolts 87. As a result of this arrangement the drilling apparatus will be rotatable on the bearings 82, 83 within a vertical plane transverse to the carriage frame 75. To the rear end of the shaft 84 is screwed a stop flange 88, which cooperates with a shoulder 89 on the rear bearing 83 for keeping the shaft against forward displacement.

Freely mounted on the shaft 84 and unrotatably connected to the bearing 83 is a radially end portion of extending lever 90, which has a widened forked end 91 forming a support for the ends of a stationary pivot 92 extending in offset and parallel relation with respect to the shaft 84. Adjacent to the front bearing 82 there is keyed to the shaft 84 a similar end portion of lever 93 likewise having a forked end 94 and a similarly extending pivot 95 rotatable in unison with the shaft 84. The forked ends 91, 94 of the levers 90, 93 are offset axially of the shaft 84 in the direction of each other. Between the stationary pivot 92 and the rotatable pivot 95 there are coupled in series and rotatably arranged on the shaft 84 two mechanisms similar to the single turning mechanism illustrated in FIGS. 1–8. To make such coupling in series possible there is provided an intermediate coupling member 96 centrally and freely rotatable on the shaft 84. The coupling member 96 has arms extending in opposite radial directions with forked ends 97, 98, which form supports for the ends of pivots 99, 100. Said pivots extend in offset and parallel relation with respect to the shaft 84 and protrude axially in opposite directions in order to bring the pivots 92, 99 and 95, 100, respectively, into common transverse central planes I and II, FIGS. 11 and 14, perpendicular to the shaft 84. The distances between the shaft 84 and the respective pivots 92, 95, 99 and 100 are equal. Between the intermediate coupling member 96 and the end portions of levers 93 and 90 and lying in the central planes I and II, respectively, there are rotatably arranged on the shaft 84 two fluid actuated double acting power jacks 101, 102, each of them arranged in full analogy with the power jack 45 of FIGS. 1–8 and each of them connected by links 103, 105 and 104, 106 to the respective pair of the pivots 92, 99 and 95, 100. The arrangement of the power jacks 101, 102 is preferably such that expansion of the jack 101, when viewed in FIG. 12, brings about turning in clockwise direction of the coupling member 96, while contraction of the jack 102 brings about turning in clockwise direction of the lever 93 and the shaft 84 with respect to the end portion of coupling member 96. Evidently the shaft 84 is rotated in the opposite counterclockwise direction by contraction of the jack 101 and expansion of the jack 102. This preferred arrangement of operation gives a more compact construction and constancy of the oil quantity supplied in both directions of rotation.

For the sake of clarity the various hoses provided for conveying pressure fluid to the different power jacks and the drill of the drill rig illustrated in FIGS. 11–15 have been omitted as was the case in FIGS. 1–10, since the provision of such hoses or conduits is obvious to those skilled in the art.

As readily seen, a full expansion of the jack 101 results in an angular displacement of the jack 101 from the position of FIG. 12 through 90° in clockwise direction to the position of FIG. 15, simultaneously with an angular displacement through 180° of the coupling member 96. If simultaneously or subsequently a full contraction of the jack 102 is performed, the jack 102 receives a total angular displacement through 270°, as depicted in FIG. 15, which is the sum of the above-mentioned throw through 180° of the coupling member 96 and the through through 90° of the jack 102. Simultaneously the end portion of lever 93 together with the shaft 84 and the drilling apparatus receives a total angular displacement through 360°. The maximum throw, however, may, in analogy with the attainable maximum throw of the embodiment of FIGS. 1-8, be extended to about the double of 240°, that is to say to some 480°. The number of jacks coupled in series may be increased if in a modified embodiment a still greater throw is desired.

With the drill rig illustrated in FIGS. 11-15 the operator may drill groups of holes in a fan shaped arrangement in a vertical plane transverse to the frame of the drill rig carriage from for example a vertically upward position of the drill 42 through an angle of 360° back to said position.

The embodiment of the invention above described and illustrated in the drawings should only be considered as examples and the invention may be modified in several different ways within the scope of the following claims.

What I claim is:

1. A rock drill rig comprising a wheel supported carriage having a pair of upright frames fixed thereon, bearings fixed on the upper end of said frames having a shaft journalled therein, a drilling apparatus carried by said shaft for rotation within a vertical plane transverse to said carriage and beyond one end thereof, a first swivel joint offset from said shaft and connected to said shaft adjacent to said drilling apparatus, a second swivel joint offset from said shaft and connected to the bearing on the frame remote from said drilling apparatus, two fluid actuated telescoping jacks each having a first and a second telescoping jack member, the first jack member of each jack rotatable on said shaft between said swivel joints, an intermediate member rotatable on said shaft between said first jack members of said jacks, a pair of swivel joints offset from said shaft on said intermediate member, and links swivelly connecting each second jack member to said swivel joints on opposite sides of each first jack member for rotating the said drilling apparatus one way or the other within said vertical plane with respect to the carriage.

2. Means for turning a member on an axis through a limited angle comprising a support, a shaft extending from one side of said support, a member rotatably mounted on said shaft to swing through a limited angle with respect to said support, a first swivel joint offset from said shaft and unrotatably connected thereto, a second swivel joint offset from said shaft and rotatably journalled on said member, cooperating power cylinder and piston elements journalled to swing on said shaft, a first force transmiting linkage between one of said elements and said first swivel joint arranged for torque transmission between said first swivel joint and said one element, a second force transmitting linkage between said one element and said second swivel joint for torque transmission between said second swivel joint and said one element, said power cylinder and piston elements acting upon said first force-transmitting linkage to cause said cylinder and piston elements to rotate around said first swivel joint and said shaft thereby causing said second force-transmitting linkage to rotate said second swivel joint and said member around said shaft.

3. In an adjustable supporting device of the character described for supporting a structure thereon and moving said structure through a plurality of positions about the axis of said device, the combination which comprises a base having a shaft extending thereon, a radial extension fixedly disposed with respect to the axis of said shaft, a bracket rotatably disposed with respect to the axis of said shaft for engaging said structure to be supported and moved, pivot means on said radial extension with the axis of said pivot means being parallel with but offset from the axis of said shaft, power extensible and retractable means with one end thereof rotatable on said shaft, and means for pivotally connecting the opposite end of said power extensible and retractable means to said bracket and said pivot means whereby extension and retraction of said extensible and retractable means causes it to swing around said pivot means and said shaft one way or the other thereby rotating said bracket means with said structure thereon around the axis of said shaft.

4. In an adjustable supporting device of the character described for supporting a structure thereon and moving said structure through a plurality of positions transverse to the axis of said device, the combination which comprises a base having a shaft thereon, a radial extension fixedly disposed with respect to the axis of said shaft, a bracket rotatably disposed with respect to the axis of said shaft for fixedly engaging said structure to be supported and moved, first pivot means on said radial extension with the axis of said pivot means being parallel to but offset from the axis of said shaft, second pivot means on said bracket and spaced from said shaft, power extensible and retractable means having one end thereof rotatably disposed on said shaft, and toggle linkage means connecting the other end of said power extensible and retractable means to both said first and second pivot means whereby extension and retraction of said power extensible and retractable means causes it to rotate around the axis of said first pivot means one way or the other thereby rotating said bracket means with said structure thereon around said shaft.

5. Apparatus as recited in claim 4 in which said toggle linkage means includes a knee-joint arranged on said power extensible and retractable means with two spaced apart pivot joints disposed in diametrically opposed relationship, a first link connecting one of said joints to said first pivot means, and a second link connecting the other of said joints to said second pivot means.

6. In an adjustable supporting device of the character described for supporting a structure thereon and moving said structure through a plurality of positions transverse to the axis of said device and having a source of pressure fluid, the combination which comprises a base having a shaft thereon, a radial extension fixedly disposed on said shaft, a bracket rotatably disposed on said shaft and axially spaced from said radial extension for fixedly engaging said structure to be supported and moved, pivot means on said radial extension with the axis of said pivot means being parallel with but offset from the axis of said shaft, a pressure fluid actuated telescoping jack in flow communication with said source of pressure fluid and having a first and a second telescoping member, the first member being rotatably disposed on said shaft, and means for connecting the second jack member to said bracket and said pivot means whereby application of said pressure fluid to said jack causes it to rotate around said pivot means and said shaft one way or the other thereby rotating said bracket with said structure thereon around said shaft.

7. In an adjustable supporting device of the character described for supporting a structure thereon and moving said structure through a plurality of positions about the axis of said device and having a source of pressure fluid, the combination which comprises a base having a shaft rotatably journaled thereon, a radial extension fixedly disposed on said shaft, said shaft fixedly engaging said structure to be supported and moved, a first pivot means on said radial extension with the axis of said pivot means being parallel to but offset from the axis of said shaft, second pivot means on said base and spaced from said shaft, a pressure fluid actuated telescoping jack in flow communication with said source of pressure fluid and having a first and a second telescoping member, the first jack member being rotatably disposed on said shaft, and toggle linkage means connecting said second jack member to both said pivot means whereby application of said pressure fluid to said jack causes it to rotate around said shaft one way or the other thereby rotating said shaft with said structure thereon around the axis of said shaft.

8. In an adjustable supporting device of the character described for supporting a structure thereon and moving said structure through a plurality of positions in a plane transverse to the axis of said device and having a source of pressure fluid, the combination which comprises a base having a shaft thereon, a radial extension fixedly disposed on said shaft, a bracket rotatably disposed on said shaft for fixedly engaging said structure to be supported and moved, first pivot means on said radial extension with the axis of said pivot means being parallel to but offset from the axis of said shaft, second pivot means on said bracket and spaced from said shaft, a pressure fluid actuated telescoping jack in flow communication with said source of pressure fluid and having a first and a second telescoping member, one jack member being rotatably disposed on said shaft, a knee joint disposed on said other jack member, said knee joint having two spaced apart pivots disposed in diametrically opposed relationship, a first link connecting one of said knee joint pivots to said first pivot means, a second link connecting the other of said knee joint pivots to said second pivot means, whereby application of said pressure fluid to said jack causes it to swivel around said first pivot means and said shaft thereby rotating said bracket means with said structure thereon around said shaft.

9. In an adjustable supporting device of the character described for supporting a structure thereon and moving said structure through a plurality of positions transverse to the axis of said device and having a source of pressure fluid, the combination which comprises a base having a shaft integral therewith, a bracket rotatably disposed with respect to the axis of said shaft for fixedly engaging said structure to be supported and moved, first pivot means parallel with but offset from the axis of said shaft and connected to said base, second pivot means on said bracket and spaced from said shaft, a power jack connected to said source of pressure fluid and having extensible and retractable jack members, one jack member being rotatably disposed on said shaft, and means for pivotally connecting said other jack member to both said pivot means for rotating said bracket one way or the other around the axis of said shaft between a position with said first and second pivot means at one side of a plane normal to said power jack through the axis of said shaft to a position with said pivot means at the opposite side of said plane.

10. In an adjustable supporting device of the character described for supporting a structure thereon and moving said structure through a plurality of positions transverse to the axis of said device and having a source of pressure fluid, the combination which comprises a base having a shaft thereon, a bracket rotatably disposed with respect to the axis of said shaft for fixedly engaging said structure to be supported and moved, first pivot means parallel with but offset from the axis of said shaft and connected to said base, second pivot means on said bracket and spaced from said shaft, a power jack connected to said source of pressure fluid and having extensible and retractable jack members with one jack member being rotatably disposed on said shaft, a toggle link knee joint arranged on the other of said jack members and having two spaced apart pivots disposed in diametrically opposed relationship, a first link connecting one of said knee joint pivots to said first pivot means, and a second link connecting the other of said knee joint pivots to said second pivot means for rotating said bracket one way or the other around the axis of said shaft between a position with said first and second pivot means at one side of a plane normal to said power jack through the axis of said shaft to a position with said pivot means at the opposite side of said plane.

11. In an adjustable supporting device of the character described for supporting a structure thereon and moving said structure through a plurality of positions in a plane transverse to the axis of said device and having a source of pressure fluid, the combination which comprises a base having a shaft thereon, a bracket fixedly disposed on said shaft for fixedly engaging said structure to be supported and moved, first pivot means rotatably disposed on said shaft but fixed against rotation therewith with the axis thereof parallel with but offset from the axis of said shaft, second pivot means disposed on said bracket with the axis thereof parallel with but offset from the axis of said shaft, two pressure fluid actuated telescoping jacks in flow communication with said source of pressure fluid and having a first and a second telescoping member, the first jack member of each jack being rotatably disposed on said shaft, an intermediate member rotatably disposed on said shaft between said first jack members, two pivots disposed on said intermediate member one on each side of the axis thereof with the axes of said pivots being parallel with each other and with the axis of said shaft, link means pivotally connecting one each of said intermediate pivots and said pivot means to one of said second telescoping members, said fluid actuated jacks acting on said link means for rotating said bracket one way or the other around the axis of said shaft.

12. In an adjustable supporting device of the character described for supporting a structure thereon and moving said structure in a plurality of positions transverse to the axis of said device and having a source of pressure fluid, the combination which comprises a pedestal for supporting said device the upper surface thereof being inclined in a central plane with respect to the lower surface, pivots disposed on said inclined surface, a parallelogram type boom frame extending upwardly from said pivots, an elongated head disposed on said frame at the end thereof opposite said inclined surface with pivots for receiving said frame, power jack means extending from said inclined surface to said head for moving said head in an inclined central plane with respect to said pedestal, a shaft disposed on said head, a radial extension fixedly disposed with respect to the axis of said shaft, a bracket rotatably disposed with respect to the axis of said shaft for fixedly engaging said structure to be supported and moved, pivot means on said radial extension with the axis of said pivot means being parallel with but offset from the axis of said shaft, pressure fluid actuated power extensible and retractable means with one end thereof rotatably connected to said shaft, and means for pivotally connecting the opposite end of said power extensible and retractable means to said bracket and said pivot means whereby application of said pressure fluid to said power extensible and retractable means causes it to swing around said pivot means and said shaft one way or the other thereby rotating said bracket means with the structure thereon around the axis of said shaft.

13. In an arrangement for rotating a member about an axis through an angle of substantially more than 180° by means of the translatory motion of a single cylinder-and-piston motor, the combination which comprises means for mounting one end of said cylinder-and-piston motor for rotation about said axis, a stationary pivot point offset from said axis, pivoted toggle means interconnecting the other end of said cylinder-and-piston motor to said stationary pivot point, means for mounting said member to be rotated for rotary movement about said axis, and second toggle means interconnecting said other end of said cylinder-and-piston motor to said member at a point thereon offset from said axis, said stationary pivot point and said toggle means connected to said member being angularly spaced apart around said axis, whereby motion in said cylinder-and-piston motor rotates both said motor and said member around said axis through said toggle means pulling against said stationary pivot point.

14. An arrangement as recited in claim 13 which also includes a second cylinder-and-piston motor interposed between said first cylinder-and-piston motor and said member to be rotated, means for mounting one end of said second cylinder-and-piston motor for rotation about said axis, toggle means connecting the other end of said second cylinder-and-piston motor to said first cylinder-and-piston motor, additional toggle means for connecting said other end of said second cylinder-and-piston motor to said member to be rotated, and means for actuating said first and second cylinder-and-piston motors sequentially effecting rotation of said member about said axis through more than 180° upon actuation of said first cylinder-and-piston motor and subsequent rotation of said member about said axis through an additional 180° upon actuation of said second cylinder-and-piston motor.

15. In an adjustable supporting device of the character described for rotatably supporting a structure on said device on means providing a journal carried thereby and moving said structure through a plurality of positions around the axis of rotation defined by said journal means, the combination which comprises a base carrying said journal means, first pivot means spaced from said axis and connected to said structure, second pivot means spaced from said axis and connected to said base, both said pivot means being parallel with said axis, a power jack coplanar with said pivot means, said power jack having cooperating extensible and retractable jack members, means on said base for rotatably supporting one of said jack members for rotation in the plane of said power jack and said pivot means, and link means for swivelly connecting the other jack member to both said pivot means for rotating said structure one way and the other with respect to said base between a position with said first and second pivot means at one side of a plane normal to said power jack through said axis and a position with said first and second pivot means at the opposite side of said plane.

References Cited by the Examiner
UNITED STATES PATENTS

| 1,150,357 | 8/34 | Gilman | 175—220 |
| 1,984,373 | 12/34 | Holmes | 175—183 X |
| 2,665,116 | 1/54 | Brink et al. | 175—183 X |
| 2,674,500 | 4/54 | Hukari | 212—35 |
| 2,703,222 | 3/55 | Feucht | 173—43 |
| 2,780,377 | 2/57 | Glenn et al. | |
| 2,949,829 | 8/60 | Askue | 173—43 |
| 2,954,754 | 10/60 | Flick | 74—102 X |
| 2,986,006 | 5/61 | Cox | 74—102 X |
| 3,021,099 | 2/62 | Samhammer et al. | 248—16 |

FOREIGN PATENTS

| 1,049,678 | 12/53 | France. |
| 21,305 | 9/12 | Great Britain. |

BROUGHTON G. DURHAM, *Primary Examiner.*